(12) United States Patent
Suntio et al.

(10) Patent No.: US 7,711,538 B2
(45) Date of Patent: May 4, 2010

(54) METHOD AND APPARATUS FOR SOFT-SENSOR CHARACTERIZATION OF BATTERIES

(76) Inventors: Teuvo Suntio, Suvitie 3, FI-01280 Klaukkala (FI); Robert Tenno, Avaruuskatu 4 A 13, FI-02210 Espoo (FI); Ander Tenno, Avaruuskatu 4 A 13, FI-02210 Espoo (FI)

( * ) Notice: Subject to any disclaimer, the term of this patent is extended or adjusted under 35 U.S.C. 154(b) by 568 days.

(21) Appl. No.: 10/497,321

(22) PCT Filed: Nov. 29, 2002

(86) PCT No.: PCT/FI02/00963

§ 371 (c)(1),
(2), (4) Date: Jun. 2, 2004

(87) PCT Pub. No.: WO03/049211

PCT Pub. Date: Jun. 12, 2003

(65) Prior Publication Data

US 2005/0052810 A1     Mar. 10, 2005

(30) Foreign Application Priority Data

Dec. 3, 2001    (FI)    ................... 20012369

(51) Int. Cl.
| | |
|---|---|
| *H02J 7/00* | (2006.01) |
| *H01M 10/48* | (2006.01) |
| *G01R 15/00* | (2006.01) |
| *G01R 21/00* | (2006.01) |
| *G01R 21/06* | (2006.01) |
| *G06G 7/48* | (2006.01) |
| *G06G 7/62* | (2006.01) |
| *G06G 7/54* | (2006.01) |

(52) U.S. Cl. .......................... 703/18; 320/124; 320/127; 320/128; 320/130; 320/132; 429/90; 702/57; 702/60; 702/63; 703/4; 703/13

(58) Field of Classification Search ................. 320/132, 320/127, 128, 130; 703/4; 434/301; 702/57, 702/60, 63; 429/90
See application file for complete search history.

(56) References Cited

U.S. PATENT DOCUMENTS 4,390,841 A * 6/1983 Martin et al. ............... 324/427

(Continued)

FOREIGN PATENT DOCUMENTS

| | | |
|---|---|---|
| JP | 11023680 | 1/1999 |
| WO | WO 03/049211 | 6/2003 |

OTHER PUBLICATIONS

A. Tenno, R. Tennoa, and T. Suntio, "Charge-discharge behaviour of VRLA batteries: model calibration and application for state estimation and failure detection" Dec. 30, 2001, Journal of Power Sources, vol. 103, Issue 1, pp. 42-53.*

(Continued)

*Primary Examiner*—Eron J Sorrell
(74) *Attorney, Agent, or Firm*—Woodcock Washburn LLP

(57) ABSTRACT

A method and apparatus for simulating the operation of a rechargeable battery. A value is obtained for at least one parameter that describes an internal state of the battery. The obtained value is used for calculating a prediction value for a characteristic of the battery that is observable outside the battery. These steps are repeated a multitude of times in order to simulate the operation of the battery over a certain period of time. A difference is detected between a calculated prediction value and a known value of a corresponding characteristic in a corresponding situation. The obtained value of the at least one parameter is corrected before a further prediction value is calculated by an amount that is proportional to the detected difference.

15 Claims, 6 Drawing Sheets-

U.S. PATENT DOCUMENTS

| | | | |
|---|---|---|---|
| 4,949,046 A * | 8/1990 | Seyfang | 324/427 |
| 4,958,127 A * | 9/1990 | Williams et al. | 324/426 |
| 5,321,627 A * | 6/1994 | Reher | 702/63 |
| 5,349,540 A * | 9/1994 | Birkle et al. | 703/13 |
| 5,394,089 A * | 2/1995 | Clegg | 324/427 |
| 5,650,937 A * | 7/1997 | Bounaga | 702/65 |
| 5,936,383 A * | 8/1999 | Ng et al. | 320/132 |
| 6,016,047 A * | 1/2000 | Notten et al. | 320/137 |
| 6,137,292 A * | 10/2000 | Hirsch et al. | 324/427 |
| 6,262,577 B1 * | 7/2001 | Nakao et al. | 324/425 |
| 6,285,971 B1 | 9/2001 | Shah et al. | |
| 6,300,763 B1 * | 10/2001 | Kwok | 324/427 |
| 6,304,062 B1 | 10/2001 | Batson | |
| 6,313,611 B1 | 11/2001 | Mowry et al. | |
| 6,362,598 B2 * | 3/2002 | Laig-Horstebrock et al. | 320/132 |
| 6,441,586 B1 * | 8/2002 | Tate et al. | 320/132 |
| 6,515,453 B2 * | 2/2003 | Feil et al. | 320/132 |
| 6,668,233 B1 * | 12/2003 | Sarfert et al. | 702/63 |
| 2002/0117997 A1 * | 8/2002 | Feil et al. | 320/132 |

OTHER PUBLICATIONS

J.J. Esperilla, J. Felez, G. Romero, A. Carretero, A model for simulating a lead-acid battery using bond graphs, Dec. 4, 2006, Simulation Modelling Practice and Theory, vol. 15, pp. 82-97.*

W. B. Gu et al., J. Electrochem. Soc., 144(6), pp. 2053-2061 (Jun. 1997).

Johan Landfors et al., Journal of Power Sources 55, pp. 217-230 (1995).

John Newman et al., J. Electrochem. Soc., 144 (9), pp. 3081-3091, Sep. 1997.

Sabine Piller et al., "Methods for state-of-charge determination and their applications," Journal of Power Sources, Jun. 2001, 96(1), pp. 113-120.

Catherino et al., "Modelling and simulation of lead-acid battery charging," Journal of Power Sources, http://www.sciencedirect.com/science? ob=ArticieURL& udi=B6TH-3WH67SD1 . . . , vol. 80, Issue 1-2, Jul. 1999, pp. 17-20.

International Search Report, dated Apr. 24, 2003, 3 pages.

Burkner, W., Verfahren zur Ladebestimmung von Blei-Batterien in Photovoltaikanlagen, Lehrstuhl von Energiewirschaft and Kraftwerkstechnik, Tu München, 1994, 42-57 (*English language translation included*).

PCT International Preliminary Examination Report completed Oct. 3, 2003, in corresponding International Application No. PCT/F102/00963.

EP Communication issued by the Examining Division Jan. 22, 2008, in corresponding EP Application No. 02781359.1.

EP Communication issued by the Examining Division Sep. 16, 2009, in corresponding EP Application No. 02781359.1.

* cited by examiner

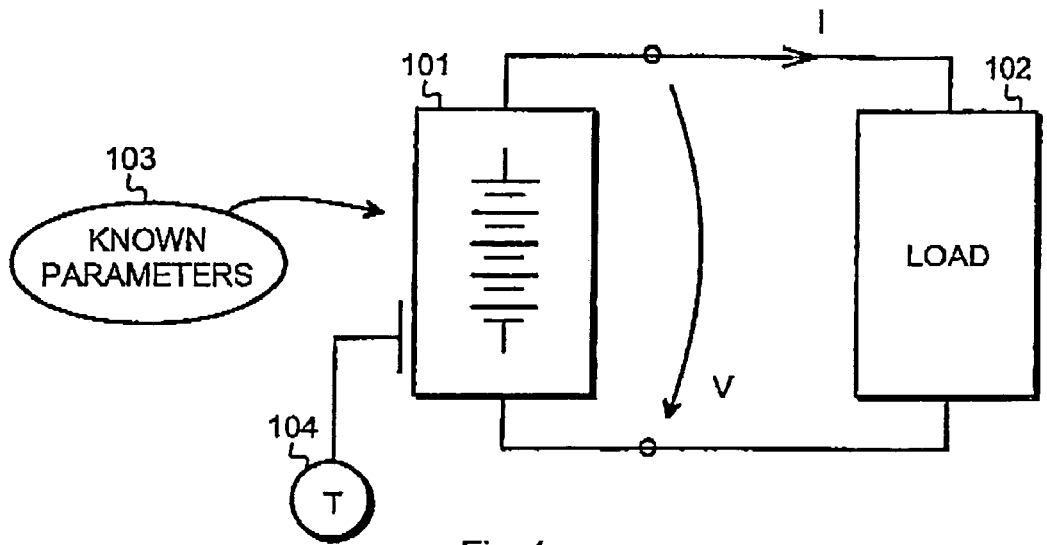
Fig. 1a
PRIOR ART
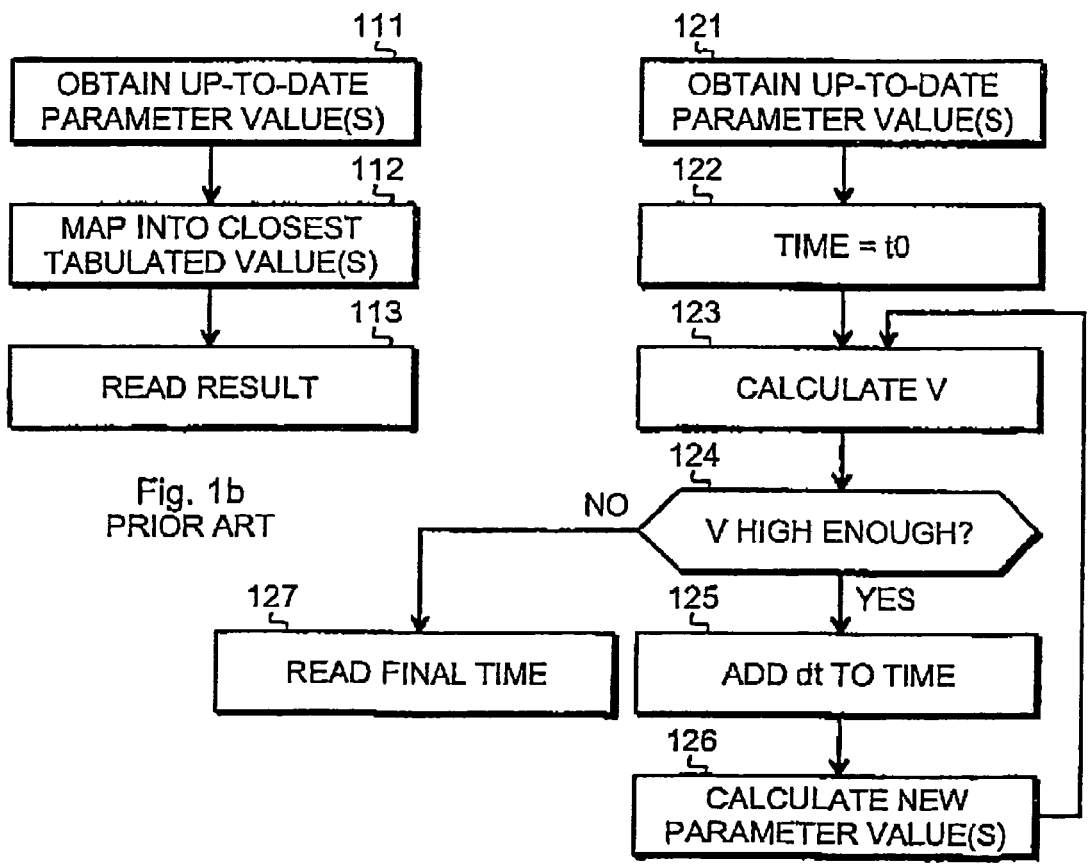
Fig. 1b
PRIOR ART
Fig. 1c
PRIOR ART

METHOD AND APPARATUS FOR SOFT-SENSOR CHARACTERIZATION OF BATTERIES

FIELD OF THE INVENTION

The present invention relates generally to the technology of mathematically modeling for the structure and operation of rechargeable batteries. More specifically, the invention concerns the technology of using such mathematical models for predicting the behavior of a modeled battery in a certain situation that is expected to occur.

BACKGROUND OF THE INVENTION

Rechargeable batteries are the most commonly used energy source of modern port-able electronic appliances. Additionally rechargeable batteries are very often used as back-up energy sources in applications where uninterrupted supply of electrical power is needed. The basic area of application of the present invention is in solutions of the latter kind, although the general principles of battery modeling and model-based predicting can also be used for other purposes. The battery type that is especially discussed in this patent application is the VRLA (Valve Regulated Lead Acid) battery, but the invention is equally applicable to all kinds of rechargeable batteries for which comparable mathematical models can be presented.

It is typical to UPS (Uninterrupted Power Supply) applications that only relatively seldom comes a real need for using the power stored in the batteries. However, if and when such a situation occurs, it should be certain that the performance and energy supplying capacity of the batteries is good enough. Internal electrochemical processes of the batteries cause slow but inevitable decrease in performance, which should be somehow accounted for. A "brute force" solution is to replace all batteries with new ones according to a pre-defined timetable, but because the timetable must in that case include an ample safety margin, it is clear that also batteries that would still be perfectly usable will be replaced. A more elegant solution is to compose a mathematical model of the structure and behaviour of a battery, to perform some basic voltage, current and temperature measurements and to use these as inputs to the mathematical model to obtain a prediction of the behaviour of the battery in a discharge situation. Only if such a mathematically calculated prediction indicates that the performance level of a battery may not be sufficiently high any more, an alarm is generated to alert a human operator about the need of replacing the battery. Using mathematical models to describe the behaviour of actual physical processes that take place inside a battery is often referred to as soft-sensor characterization, because the modeling software produces similar "measurement" results as could be obtained by placing measuring devices inside the battery.

Mathematical simulation of lead-acid batteries has been treated in various prior art publications, including but not being limited to J. Newman and W. Tiedemann: "Simulation of Recombination Lead-Acid Batteries", J. Electrochem. Soc. vol. 144, no. 9, pp. 3081-3091,1997; H. Gu, C. Y. Wang and B. Y. Liaw: "Numerical Modeling of Coupled Electrochemical and Transport Processes in Lead-Acid Cell", J. Electrochem. Soc. vol. 144, no. 6, pp. 2053-2061, 1997; and J. Landfors, D. Simonsson and A. Sokirko: "Mathematical Modelling of a Lead-Acid Cell with Immobilized Electrolyte", Journal of Power Sources, no. 55, pp. 217-230, 1995. These publications are incorporated herein by reference.

FIGS. 1a, 1b and 1c illustrate schematically certain conventional principles of simulating the behaviour of a battery or arrangement of batteries when they are used as a power source. FIG. 1a shows the situation to be simulated: a battery 101 is coupled to a load 102 in order to provide the load with an operational voltage V and an electric current I. A set of parameter values 103 is known that describe the structure and state of the battery 101. An explicitly shown parameter value is the temperature T of the battery, which is measured continuously or regularly with a measuring arrangement 104. Simulating aims at providing an answer to the question: starting from the moment when the battery 101 is coupled to the load 102 to replace a normally used power source, how long time will it take before the battery 101 is discharged so much that it can not sustain a sufficient supply of electric energy to the load 102?

The terms "back-up time" and "cut-off time" are used (sometimes even a bit confusingly) to define two slightly different kinds of answers. Back-up time is defined in relation to the remaining capacity of the battery 101, usually so that back-up time ends when 90 percent of the original battery capacity has been used up. Cut-off time is defined in relation to a sufficient voltage level. Cut-off occurs when the voltage per cell in the battery 101 drops below a certain minimum level, for which different values may exist depending on load current. A widely used cut-off voltage level for VRLA batteries under high-rate discharge is 1.55 volts per cell.

FIG. 1b illustrates a known trivial method which has relatively little to do with actual mathematical simulation. The method of FIG. 1b is based on the fact that one has obtained a large set of experimental data and composed a look-up table where each of a large number of potentially occurring initial conditions is associated with a corresponding experimentally verified back-up or cut-off time. At step 111 the present state of the battery is checked by obtaining up-to-date values for certain parameters. At step 112 these actual parameter values are compared with those that have been stored as indicators of starting conditions in the experimentally handled example cases, and those stored parameter values are selected that match the actual values as closely as possible. At step 113 there is simply read from the look-up table that experimentally obtained back-up or cut-off time that has been associated with the selected initial condition parameter values.

FIG. 1c illustrates a known more simulation-oriented approach. Again at step 121 certain parameter values are obtained that describe the present state of the battery. The simulation algorithm sets a TIME variable to zero at step 122 and calculates at step 123 the value of the voltage V that can be obtained with the parameter values as they are. At step 124 the simulation algorithm checks, whether the obtained voltage value is above the above-mentioned minimum level. If the mathematical model handles battery capacity instead of voltage, steps 123 and 124 are adapted so that battery capacity replaces voltage. Typically at this stage the result of step 124 positive, because the simulation calculations are only at the very beginning. Therefore the algorithm proceeds to step 125 where it increases the value of the TIME variable by a certain relatively short simulation interval dt in order to simulate the passing of time. Thereafter the simulation algorithm calculates at step 126, how did the parameter values change during the simulation interval dt. A return to step 123 occurs so that the simulation algorithm now calculates a new value for the voltage V (or the battery capacity) that takes into account the new parameter values calculated at step 126. Again the newly calculated voltage value (or battery capacity) is checked against the minimum level at step 124. The algorithm executes the loop that consists of steps 125,126, 123 and 124 in this order over and over again until at some stage the calculated voltage value or battery capacity value fails the test in step 124. Thereafter the algorithm exits the loop into step 127 and announces the final value of the TIME variable as the length of time it took for the battery to discharge.

The drawback of prior art simulation methods and devices is mainly their limited accuracy in predicting the actual behaviour of a battery. The simulation approach shown in FIG. 1c is only as good as are the assumptions made about the time-dependent behaviour of the parameters that describe the state of the battery. Even a small inaccuracy in the predicted behaviour of a parameter may lead to remarkable deviations from a correct result, because the typically relatively large number of simulation steps that are taken before the voltage or capacity value drops below the minimum level has a tendency to amplify the effect of such inaccuracies.

SUMMARY OF THE INVENTION

It is an object of the present invention to provide a method and apparatus for accurately predicting the back-up or cut-off time that can be obtained with a certain battery. It is an additional object of the invention that the method and apparatus can be applied to a wide variety of battery and load types. Another object of the invention is to make the prediction of back-up or cut-off time accurate irrespectively of how long the battery has been in use.

The objects of the invention are achieved by using the known (possibly time-dependent) behaviour of the current taken by a load to generate feedback information that stabilizes the mathematical model so that a calculated current would differ as little as possible from the known current throughout the simulation.

The characteristic features of a method according to the invention are recited in the independent patent claim directed to a method.

The invention applies also to an apparatus, the characteristic features of which are recited in the independent patent claim directed to an apparatus.

Various embodiments of the invention are described in the depending claims.

The procedure of using a mathematical model to describe the behaviour of a battery, in which the procedure of the invention comprises two distinct phases: model calibration and predictive calculation. Of these, model calibration means performing multidimensional optimization in order to find a set of parameter values that make a parameterized mathematical model correspond as accurately as possible to the internal characteristics of a certain individual battery the behaviour of which is to be analyzed. Predictive calculation means mathematically simulating a real back-up situation where a battery, for which model calibration has been performed, would be coupled to a load in order to provide the load with electrical energy taken from the battery.

In order to perform model calibration, certain measurements must be made regarding the actual, prevailing physical state of the battery. These measurements are most advantageously performed so that the battery is taken through a certain well-defined cycle of discharging and recharging, during which cycle measurable quantities such as the output current and output voltage are repetitively measured. The measured values of these quantities are stored, so that afterwards a sequence of stored values that relate to a certain cycle of discharging and recharging may be said to constitute a characteristic curve.

A mathematical model of a battery comprises a number of parameters. If the model would describe only a certain battery type in general, certain default values could be used for these parameters. The aim of model calibration in the context of the present invention is to find, for each individual battery, a customized set of parameter values that make the model describe the characteristics and behaviour of just that battery as realistically as possible. For this purpose there is used the characteristic curve obtained through the above-mentioned cycle of discharging and recharging.

A number of equations are derived from the mathematical model and associated with selected points of the characteristic curve so that the parameter values appear as unknown variables in the equations while the measured quantity values are considered to be exact. Said equations are together subjected to multidimensional optimization, for which several methods are known as such. The default values can be used as starting points for the parameter values-alternatively, if model calibration has been performed previously, one may use the parameter values that were found during a previous model calibration. As a result of optimization each parameter attains a value that together with the other obtained parameter values adapts the mathematical model in an optimal way to describe the prevailing state of the battery at the time when the measurement results were obtained. The parameter values given by the multidimensional optimization algorithm are stored.

After model calibration has been performed, predictive calculation according to the invention can take place completely independently of actual charging or discharging of the battery. As the first step of predictive calculation there are calculated the output voltage and output current that the battery would provide to the load at the moment of initiating a back-up situation. Thereafter the calculation proceeds in successive simulation steps. If we define that the battery's output voltage and output current were first calculated at a moment of time $t_0$, the next simulation step corresponds to calculating the battery's output current at a moment $t_0+\Delta t$, where $\Delta t$ is the so-called simulation interval. The parameterized mathematical model of the battery takes into account the development of the battery's characteristics over time during discharging, so the simulation step corresponding to moment $t_0+\Delta t$ is likely to give a slightly different output voltage and output current than that corresponding to moment $t_0$.

Up to the calculation of the output voltage and output current the simulation proceeds as in known prior art methods. However, according to the invention each simulation step that gave certain output values is complemented by comparing a calculated value, typically the calculated output current, with a known value. Output current is readily available for comparison, because the current that a load is known to draw from the battery is typically known or can be predicted with high accuracy. The comparison provides a kind of feedback that describes, how well did the simulation step manage to predict the actual current. Let us assume that a difference $\Delta i$ was found between the simulated output current and the known current value. The feedback is taken into account so that before continuing the calculation into a subsequent simulation step, the mathematical model is corrected by a factor the magnitude of which is proportional to the magnitude of the difference $\Delta i$.

The fact that a simulation step predicted a current value that differed by a factor $\Delta i$ from the known actual current means that the mathematical model was not completely accurate. Taking the difference $\Delta i$ into account means that such inaccuracy of the mathematical model is removed to a large extent, so that at least the accumulation of errors during successive simulation steps is prevented. The same deduction applies regardless of whether it is the output current or some other calculated value that is used for obtaining feedback.

This makes the method and apparatus according to the invention far superior in accuracy than the prior art methods known at the priority date of this patent application.

The same inventive principle can be applied to any kind of batteries and loads, as long as there exists a mathematical model for the behaviour of the battery as well as knowledge about the current that the load will take during a back-up situation, or some other factor that is either known or can be accurately predicted. Model calibration can (and typically also will) be performed every now and then during the lifetime of a battery, which takes care of always adapting the mathematical model to the most recent known internal state of the battery.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1a to 1c illustrate certain known concepts of simulating a battery back-up arrangement.

DETAILED DESCRIPTION

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

Figure 2A:
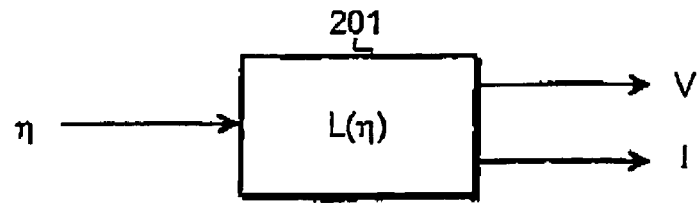
FIGS. 2a to 2c illustrate schematically the concept of feedback in battery simulation.

FIG. 2a is a simple graphical representation of the principle of predictive calculation, i.e. mathematically simulating a battery in a back-up situation in a known way. The symbol $\eta$ at the left denotes overpotential, which is a parameter that is commonly used to describe the state of a battery during discharging (the whole name of this parameter is surface overpotential, and the definition is $\eta = \Phi^S - \Phi^1 - U$ where $\Phi^S$ denotes solid matrix potential, $\Phi^1$ denotes electrolyte potential and U denotes thermodynamic equilibrium potential). The block 201 represents a mathematical operation where the overpotential $\eta$ is operated upon by a certain nonlinear operator L. As a result, a certain voltage value V and a certain current value I are obtained. These are the voltage and current values respectively that the mathematical model predicts the battery to be able to deliver at its output terminals, when the battery has a certain overpotential $\eta$. Dependency on time and battery characteristics is inherent in the model, because the overpotential $\eta$ is a function of battery characteristics and the whole calculation only pertains to a certain moment of time. As the simulation proceeds through successive simulation steps, the overpotential value changes, which causes the voltage V and the current I to change accordingly.

Increasing the accuracy of the simulation would be simple, if the operator L could be easily inverted. Namely, the actual time-dependent current that the load will take during a back-up situation is generally known or at least can be predicted with very high accuracy. Let us denote this actual current with I*. If we know an inverse operator $L^{-1}$ that only needs a current value as its input, we may calculate the actual overpotential $\eta$* at any moment of time according to the formula $$\eta^* = L^{-1}(I^*)$$

Thereafter it is straightforward to obtain the actual voltage value V* at the corresponding moment of time by applying the original operator L to the actual overpotential $\eta$* given by formula (1).

Figure 2B:
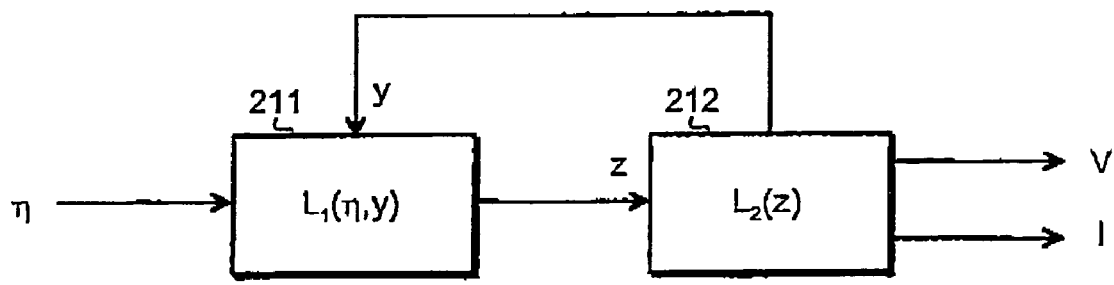

The problem of such an ideal approach is that the operator L is generally a very complicated one, and it is thus not possible to obtain any inverse operator $L^{-1}$ that would have the required properties. The complicatedness of the operator L comes from the fact that L is heavily dependent on the thermodynamic state of the battery. FIG. 2b illustrates schematically such dependency. Let us assume that the thermodynamic state of a battery can be described with two (vector) variables y and z. The form of the operator L is typically such that it consists of two chained operations $L_1$ and $L_2$, of which $L_1$ operates upon the overpotential $\eta$ and the variable y and gives as a result a value for the variable z. Block 211 represents $L_1$ in FIG. 2b. $L_2$ operates upon the variable z and gives as a result values for the voltage V, the current I as well as the variable y. The last-mentioned is taken back to the operation $L_1$ to be used there. Block 212 represents $L_2$ in FIG. 2b.

Figure 2C:
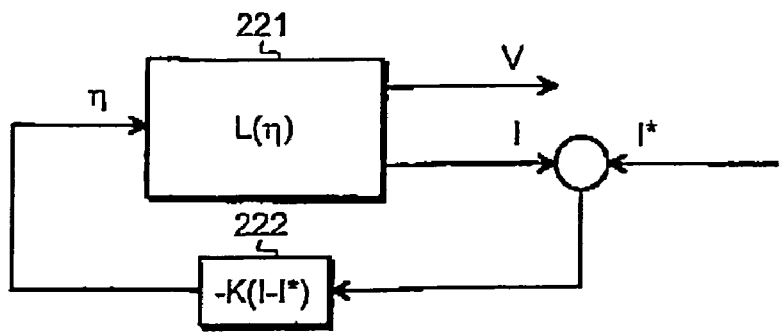

FIG. 2c illustrates the feedback approach that is suggested in the present invention.

The idea is conceptually related to the above-discussed, in practice impossible inversion principle regarding the fact that one should indeed utilize the knowledge about the time-dependent actual current I*. However, instead of trying to invert the operator L that is schematically represented in block 221, the invention accepts the fact that the current value I that the operator gives is somewhat inaccurate, and suggests finding out exactly how inaccurate it is. In other words, the calculated current value I and the corresponding actual current value I* are taken to a feedback operator block 222 that calculates a corrective term according to the general operator-level expression $$I, I^* \rightarrow -K(I - I^*) \qquad (2)$$

The corrective term is used to trim the value of the overpotential $\eta$. In its simples form the corrective term is just the difference I–I* multiplied by a constant, the most appropriate value of which can be found by experimenting. The exact form of the corrective term is not important to the present invention. Much more important is the whole meaning of the feedback. If the mathematical model implemented in block 221 gave a too high current value I, it means that the overpotential used in obtaining said current value was too high. Similarly if the mathematically obtained current value I was too low, the overpotential that was used in obtaining it was also too low. A correction in the overpotential value will result in a more accurately predicted current value.

It is possible to use the feedback information in two alternative ways regarding the proceeding of the simulation from one step to another. The first alternative is that the calculations according to blocks 221 and 222 are performed only once per simulation step, so that the corrective term obtained from the calculation at block 222 is only used to correct the overpotential value that will be used in the next simulation step. This alternative is simpler in terms of required computing power, so it is the better choice if the simulation results must be obtained very quickly and/or with limited resources. The other alternative is to allow multiple iterations at each simulation step: the difference between the calculated current I and the actual current I* is compared to a small threshold value, and if it exceeds the threshold, a correction term is calculated in block 222, the overpotential value η is corrected and the calculation of the voltage and current values V and I in block 221 is repeated. The loop of making the calculations of block 221, comparing the difference between the obtained current and the actual current to a threshold value and correcting the overpotential value through block 222 is repeated without proceeding to the next simulation step until the difference between the obtained current and the actual current becomes smaller than the threshold value, meaning that the overpotential value has essentially converged to a value that most reliably describes the actual state of the battery at that moment.

Figure 3:
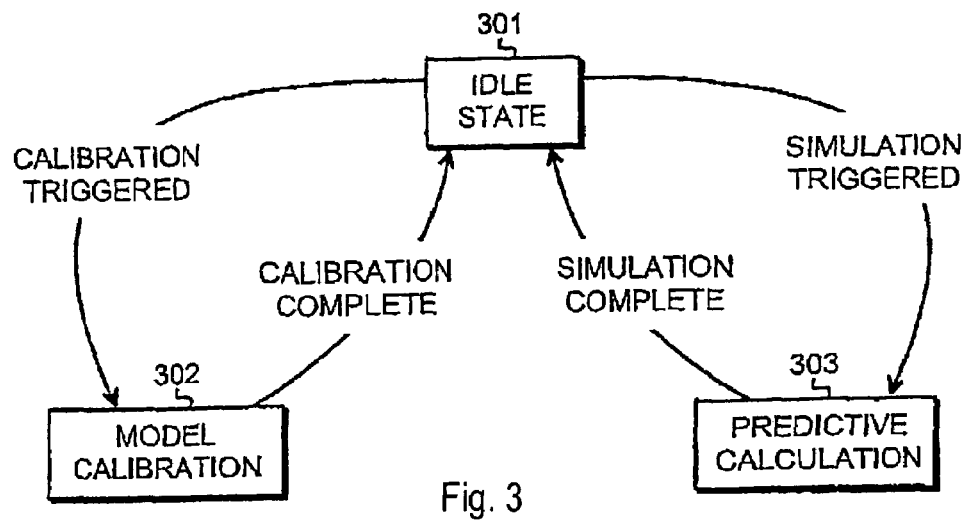
FIG. 3 is a general level state diagram illustrating a method according to an embodiment of the invention.

The invention involves model calibration as well as predictive calculation. Typically the method according to the invention is implemented as instructions that drive a certain programmable apparatus to perform the necessary operations. FIG. 3 illustrates a method according to the invention on a high level of abstraction. Typically most of the time is spent in an idle state 301. The occurrence of a certain predefined condition causes a model calibration to be triggered, which in FIG. 3 corresponds to going into a model calibration state 302. When the model calibration is complete, the idle state 301 is resumed. The occurrence of a certain other predefined condition causes a predictive calculation to be triggered, which in FIG. 3 corresponds to going into a predictive calculation state 303. After the simulation calculations are complete, the simulated back-up time is given as a result and the idle state 301 is again resumed.

We will now consider the model calibration state 302 in more detail. The purpose of model calibration is to obtain enough information about the actual, measurable physical behaviour of a battery or an arrangement of batteries in order to adapt the mathematical model so that it conforms as closely as possible to the present physical state of said battery or arrangement of batteries. The most readily available moment of obtaining such information is such where the battery is taken through a cycle of discharging and charging under controlled circumstances. In view of the present invention the actual procedure of model calibration belongs merely to prior art, because it has little to do with using feedback for enhancing the accuracy of back-up time predictions.

Figure 4:
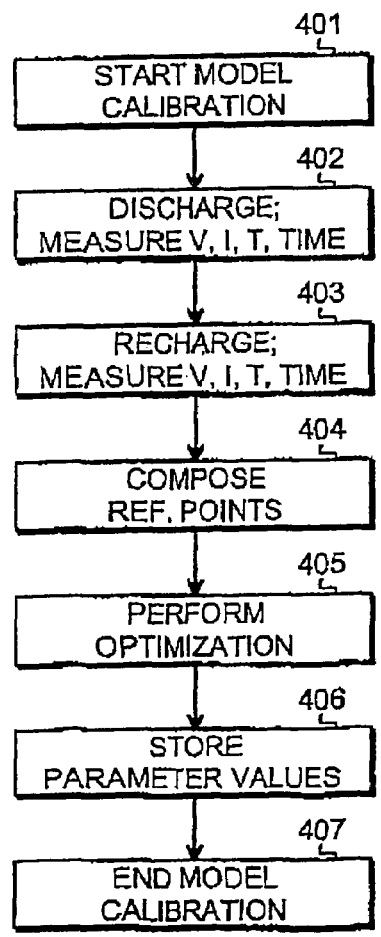
FIG. 4 illustrates model calibration.

In FIG. 4 step 401 means starting model calibration after the condition that triggers a transition from the idle state to a model calibration state has been fulfilled. Said condition can be e.g. the expiration of a certain timer, if we assume that as a part of some normal, regularly initiated maintenance routine the batteries are subjected to controlled discharging followed by recharging to the state of full readiness. Model calibration can naturally also be triggered as a response to an explicit, locally or remotely given command from a user or maintenance person. At step 402 the battery or arrangement of batteries is discharged under controlled circumstances, while simultaneously measuring a voltage V and current I used for discharging, the temperature T of the battery or the arrangement of batteries, as well as time. After the discharging step there follows a step of recharging 403, during which the voltage across the battery or arrangement of batteries, the current used for recharging, the temperature of the battery or arrangement of batteries as well as time are again measured.

The measurement results of voltage, current, temperature and time taken during discharging and recharging constitute a large set of points in a four-dimensional quantity space. For the purpose of performing multidimensional optimization a subset of these points is selected as reference points at step 404. More generally, the measurement results are used as the reference information against which the mathematical model of the battery or arrangement of batteries is tested during multidimensional optimization. This means that the parameter values that appear in the mathematical model are systematically tuned so that a best possible agreement between the model and corresponding experimental data (the reference information) is reached. Multidimensional optimization as a mathematical concept is known as such and beyond the scope of this description. Several known methods exist for multidimensional optimization, such as the simplex method.

During the research and development work that led to the invention a testing arrangement was made in which four VRLA batteries were connected in series. Model calibration can be made for each of such serially connected batteries separately (i.e. so that a separate, calibrated model is obtained for each individual battery) even if they are all discharged together to a common load and all recharged together with a common power source, as long as the voltage over each battery can be monitored separately. An exemplary list of parameters that are common to a group of serially connected batteries and for which values are commonly found during model calibration is as follows:

$Q_{max}$—theoretical capacity, C/cm³

$U_{ref}$—thermodynamic equilibrium potential, V $A_{max}$—active surface area per unit volume of porous electrode, cm²/cm³

$i_0$—exchange current density for standard temperature of 25° C., A/cm²

$\alpha_a$—anodic apparent transfer coefficient, no unit $\alpha_{Ah}$—charging efficiency, no unit $\sigma$—conductivity of bulk electrode material, S/cm $c_{ref}$—reference (initial) acid concentration, mol/cm³

$D_{ref}$—reference value of diffusion constant for standard temperature of 25° C., cm²/s $V_0$—partial molar volume of acid in electrolyte, cm³/mol $V_e$—partial molar volume of water in electrolyte, cm³/mol $\kappa_{ref}$—reference value of acid conductivity for standard temperature of 25° C., S/cm $t^0_+$—transference number, share of total current carried by H⁺ ions, no unit $\beta_1$—tortuosity exponent used for surface area, no unit $\beta_2$—tortuosity exponent used for reaction rate, no unit $\beta_3$—tortuosity exponent used for conductivity of porous electrode, no unit $\beta_4$—tortuosity exponent used for conductivity of porous electrodes and separator, no unit An exemplary list of parameters that are specific to each of the serially connected batteries and for which values are separately found during model calibration is as follows:

thickness of electrodes and separator, mm state of charge-related tortuosity exponent in discharge reaction, no unit density of electrodes ($\rho$), g/cm³ electrode morphology constant ($\gamma$), no unit

In FIG. 4 step 405 corresponds to performing the actual optimization, i.e. finding the most appropriate parameter values. The final values upon which the optimization algorithm converged are stored at step 406, and the process of model calibration is terminated at step 407.

Figure 5A:
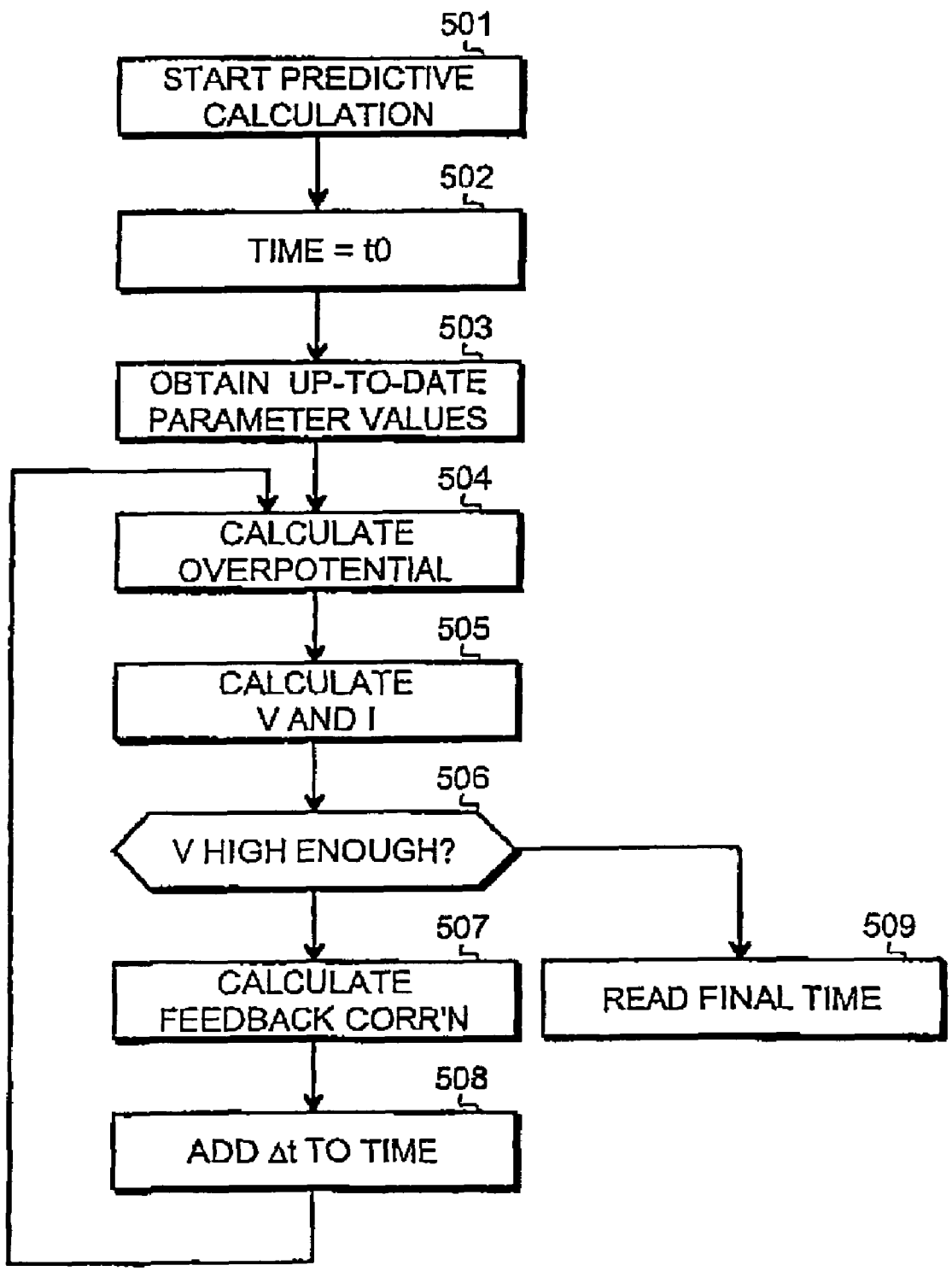
FIGS. 5a and 5b illustrate alternative methods of predictive calculation and FIG. 6 illustrates an apparatus according to an embodiment of the invention.

FIG. 5a illustrates schematically a method for predictive calculation according to an embodiment of the invention where feedback from the current difference is only taken into account in an immediately subsequent simulation step. In FIG. 5a step 501 means starting predictive calculation after the condition that triggers a transition from the idle state to a predictive calculation state has been fulfilled. Similarly as in the case of triggering model calibration, said condition can be e.g. the expiration of a certain timer, if we assume that predictive calculation is a part of some normal, regularly initiated maintenance routine. Predictive calculation can naturally also be triggered as a response to an explicit, locally or remotely given command from a user or maintenance person.

At step 502 the algorithm initiates time to zero, and at step 503 it obtains those parameter values that resulted from the most recent round of model calibration. At step 504 the algorithm calculates an overpotential value that is based on the obtained parameters. At step 505 it calculates the predicted output voltage and current. At step 506 is checks, whether the calculated voltage is above the minimum value needed to sustain battery back-up. As a response to a positive finding at step 506 the algorithm uses both the predicted output current and the known actual current that the load would take to calculate the feedback correction factor. At step 508 it adds one simulation time interval to the time variable, after which is returns to step 504 where a new overpotential value is now calculated taking into account both the time development of the parameter values and the feedback correction factor calculated at step 507. The algorithm circulates in the loop consisting of steps 504, 505, 506, 507 and 508 until after a certain number of rounds at step 506 there comes a negative finding according to which the voltage has dropped below the required mini-mum value. At that stage the algorithm exits from step 506 to step 509 where it announces the value of the time variable as the predicted cut-off time.

Again if back-up time is considered instead of cut-off time, the algorithm must produce at step 505 a predicted capacity value and compare it against a threshold capacity value at step 506, so that exit from step 506 to step 509 occurs when the calculated capacity value falls below the threshold capacity value.

Figure 5B:
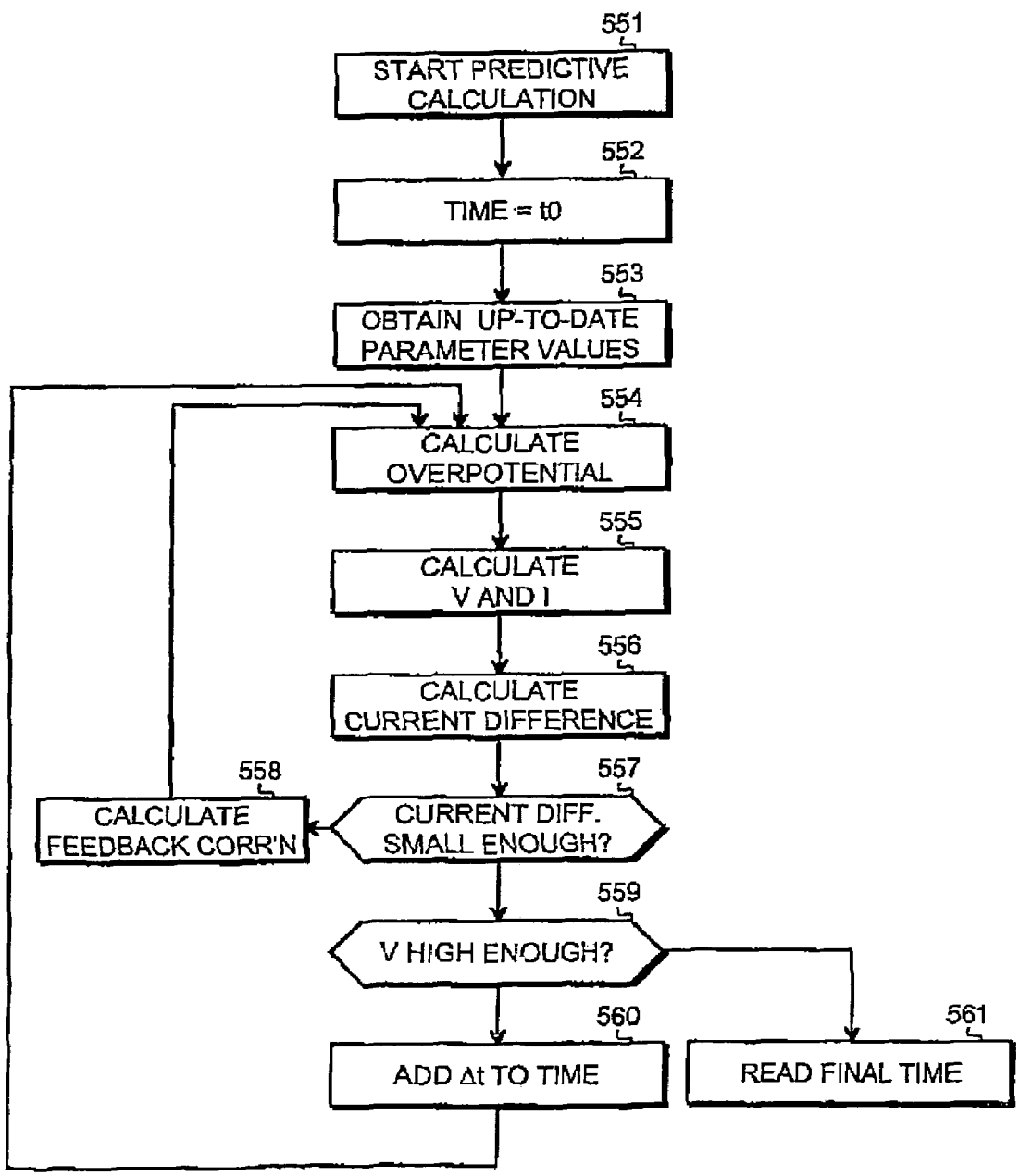

FIG. 5b illustrates schematically an alternative embodiment of predictive calculation according to the invention. Steps 551 to 553 and 555 correspond to steps 501 to 503 and 505 in FIG. 5a respectively. However, after step 555 there follows a step 556 where the difference between the predicted output current and the actual load current is calculated. This difference is compared against a certain threshold value at step 557. If the difference is larger than said threshold, the algorithm calculates a correction factor to the overpotential at step 558 without changing the value of the time variable. In other words the algorithm tries to find the correct overpotential for the present simulation step, whereas in the embodiment of FIG. 5a the feedback correction calculated during a certain simulation step was taken into account only at the subsequent simulation step. The algorithm of FIG. 5b circulates in the loop consisting of steps 554, 555, 556, 557 and 558 until an overpotential value is found that squeezes the current difference below the threshold. Only thereafter the algorithm compares the predicted voltage value against the minimum voltage level at step 559. If the predicted voltage is still high enough, the algorithm adds one simulation time interval to the time variable at step 560 and returns to step 554, where no further feedback correction need now to be taken into account because the feedback was already utilized in the loop consisting of steps 554, 555, 556, 557 and 558 in order to make the overpotential converge into the most appropriate value.

A negative finding at step 559 causes an exit to the final step 561 where the predicted cut-off time is announced. The previous discussions about replacing cut-off time with back-up time apply, i.e. the algorithm may produce at step 555 a predicted capacity value and compare it against a threshold capacity value at step 559, so that exit from step 559 to step 561 occurs when the calculated capacity value falls below the threshold capacity value.

Step 555 does not need to produce a calculated value for the output voltage, because a voltage value is only needed in the comparison of step 559. It is possible to only calculate current values while still within the loop consisting of steps 554, 555, 556, 557 and 558, tune the overpotential with the feedback information taken into account and only calculate a voltage value for the purposes of the comparison at step 559 after the most appropriate overpotential value has been found.

In the predictive calculation examples of FIGS. 5a and 5b we have only considered the predicted output current as the quantity that forms the basis for feedback corrections. The same principle can be generalized so that if the mathematical model that is used to describe the time-dependent behaviour of a battery gives a certain predicted value for which there exists a real-life counterpart that is either known or can be accurately predicted, the difference that is observed between the predicted value and the real-time value can be used to construct a corrective feedback connection to the parameter values that are used as the basis of the feedback calculation. In FIGS. 5a and 5b replacing current with some other quantity would have self-evident effects on steps 504, 505, 507, 554, 555, 556, 557 and 558.

The actual content of the mathematical model that is used in the calculations described above is not that important to the idea of using feedback, as long as the feedback can be fluently accommodated in executing the necessary calculations. However, we may describe an exemplary model in some more detail. On a relatively high level of abstraction we may represent the battery model as a system $$dz = [A_5 z - b(z)] dt, \; z_t = z_0 \qquad (3)$$

where z is a vector variable $z = [i_1, \Phi^1, \Phi^S, \epsilon, c, SOC]^T$ that describes the electrochemical state of the battery. The components of the vector are $i_1$=electric current density in the electrolyte (A/cm$^2$), $\Phi^1$=electrolyte potential, $\Phi^S$=solid matrix potential, $\epsilon$=porosity, i.e. volume fraction filled with acid (no unit), c=acid concentration (mol/cm$^3$) and SOC=state of charge (no unit). Every process in the battery is space-dependent; this dependency can be represented to that the processes are separately analyzed in a number of layers that together constitute a sandwich of two electrodes and a separator. In formula (3) $A_5$ denotes a penta-diagonal matrix and b(z) is some function of z that can be linear, bilinear, hyperbolic or exponential depending on co-ordinate. The model represented by formula (3) is dynamic for porosity, acid concentration and state of charge. It is static for other components, i.e. current and potential (dx=0; $x = [i_1, \Phi^1, \Phi^S]^T$).

The system represented by formula (3) can be solved using a time-iterative calculation procedure where time t assumes discrete values t=0, $\Delta t$, $2\Delta t$, ... and $$z_{t+1} = z_t + [A_5 z_t - b(z_t)] \Delta t, \; z_t = z_0 \qquad (4)$$

This is a two-rate system. Here current and potential are considered as dynamic processes using a small parameter technique to introduce a slow component to the system.

The thickness of a porous electrode is about 1 mm or less. A small simulation time interval in the order of 250 ms should be used for stable approximation of the electrode with multiple layers, although the simulation time interval can in some cases be increased even to the order of 20 s. The number of layers that are considered to account for the spatial dependency is typically 6 or less, although nothing prevents one from increasing the number of layers if the required computational power is available. Generally we may state that there are L layers, where L is a positive integer.

The penta-diagonal property of the matrix $A_5$ can be utilized to cut down the amount of required computational power. A sparse matrix technology has been discussed in the book "Sparse Matrix Technology" by S. Pissanetzky, Academic Press 1984, through which the number of mathematical operations required in solving the system represented in formula (4) can be reduce the need of computational power by to decades.

Using the fact that the matrix $A_5$ has 5 diagonals for acid concentration and 2 diagonals for all other processes, the calculating procedure can be made faster still. In the research and development work that led into the present invention the calculation procedure was rendered fast enough for application in real-time simulation of charge-discharge processes. In general it is complicated to apply 2- and 5-diagonals' properties simultaneously. However, it is simpler to apply these properties if one solves the system (4) for every process separately assuming that the other processes are known from the last step of iteration. This separation will not produce essential inaccuracy in the case of smooth variations in the processes, although it tends to underline the importance of selecting the simulation time step in the order of 250 ms instead of the larger steps mentioned above.

Several methods can be proposed for solving the system of formula (4). In the following we discuss briefly three alternative methods that differ from each other in computational speed as well as in accuracy. The first method comprises the following steps: Initiation step: define an initial state of the battery by using certain reference values for the processes, i.e. let $z=z_0$.

Step 1: Calculate a Volumetric Reaction Rate j(x) by Applying a Formula $$j = i_0 \left( \frac{c}{c_{ref}} \right)^{\beta 2} \left[ \exp\left( \alpha_s \frac{F}{RT} \eta \right) - \exp\left( -\alpha_c \frac{F}{RT} \eta \right) \right] \quad (5)$$

where $i_0$ is exchange current density for standard temperature of 25° C., $A/cm^2$ c is acid concentration, $mol/cm^3$ $c_{ref}$ is reference (initial) acid concentration, $mol/cm^3$ $\beta_2$ is tortuosity exponent used for reaction rate, no unit $\alpha_a$ is anodic apparent transfer coefficient, no unit F is Faraday's constant R is universal gas constant T is temperature, K $\eta$ is surface overpotential and $\beta_s$ is cathodic apparent transfer coefficient, no unit.

The volumetric reaction rate is calculated for fixed concentration and potential, i.e. $z_0 = [c_0, \eta_0]$. The volumetric reaction rates in the separator and centres of electrodes are zero.

Step 2: Solve Equation $$\frac{\partial i_1}{\partial x} = A_j \quad (6)$$

where $i_1$ is electric current density in the liquid phase of electrolyte, $A/cm^2$ A is active surface area per unit volume of porous electrode, $cm^2/cm^3$ j is transfer current density from electrolyte to solid matrix, $A/cm^2$ $A_j$ is volumetric reaction rate, $A/cm^3$ as system $A_2 i_1 = b(z_0)$ for the current density in liquid phase. Here $A_2$ is a double-diagonal matrix, $b(z_0)$ is a power function and $z_0$ is state of charge (fixed parameter: $z_0 = SOC_0$). The boundary condition for current density in separator is equal to applied current, which during predictive calculation means the current delivered at the output terminals of the battery in a back-up situation. Take the feedback information into account according to the invention by using a PID (proportional, integral and derivative) control algorithm to change the overpotential ($\eta_0(0), \eta_0(L)$; overpotential in the 0:th layer, overpotential in the L:th layer) in the centres of the electrodes so that the predicted current value comes close enough to the known current value. The boundary values for liquid potential can be calculated by this method.

Step 3: Solve Equation $$i_s = i_{app} + \sigma^{eff} \frac{\partial \phi^s}{\partial x} \quad (7)$$

where $i_s$ is current density in solid matrix of electrode, $A/cm^2$ $i_{app}$ is applied current density, $A/cm^2$ $\sigma^{eff}$ is conductivity of porous electrode, $\sigma^{eff} = \sigma \epsilon^{\beta 3}$ $\sigma$ is conductivity of bulk electrode: Pb or $PbO_2$, S/cm $\epsilon$ is porosity of electrode, i.e. volume fraction filled with acid, no unit $\beta 3$ is tortuosity exponent used for conductivity of porous electrode, no unit $\Phi^S$ is solid matrix potential, V as system $A_2 \Phi^S = b(z_0)$ for the solid potential. Here $A_2$ is a double-diagonal matrix, $b(z_0)$ is a linear function and current density is a fixed parameter: $z_0 = i_{1,0}$. The starting points for calculation are zero boundary values at separator surface. A back-forward solution of equation (7) can be used for the positive electrode and a forward solution for the negative electrode. There will be free boundary values in the centres of the positive and negative electrodes.

Step 4: Solve Equation $$\frac{i_1}{\kappa^{eff}} = -\frac{\partial \phi^l}{\partial x} + \frac{RT}{F}[(3-2t_+^0)/c + 2V_0/(1-cV_e)]\frac{\partial c}{\partial x} \quad (8)$$

where $i_1$ is electric current density in the liquid phase of electrolyte, A/cm$^2$ $\kappa^{eff}$ is conductivity of porous electrodes and separator, S/cm; $K_{eff} = \kappa \epsilon^{\beta 4}$ where $\kappa$ in turn is $\kappa_{ref}$ for standard temperature of 25° C. and acid concentration 4.9 mol/dm$^3$ and otherwise derived therefrom through standard literature methods $\epsilon$ is porosity of electrode, i.e. volume fraction filled with acid, no unit $\beta 4$ is tortuosity exponent used for conductivity of porous electrodes and separator, no unit $\Phi^1$ is electrolyte potential, V F is Faraday's constant R is universal gas constant T is temperature, K $t_+^0$ is transference number, share of total current carried by H$^+$ ions, no unit c is acid concentration, mol/cm$^3$ $V_0$ is partial molar volume of acid in electrolyte, cm$^3$/mol $V_e$ is partial molar volume of water in electrolyte, cm$^3$/mol as a system $A_2\Phi^1 = b(z_0)$ for the liquid potential. Here $A_2$ is a double-diagonal matrix, $b(z_0)$ is a nonlinear function, and current density and acid concentration are fixed parameters: $z_0 = [i_{1,0}, c_0]$.

Step 5: Solve Equation $$\frac{\partial \epsilon}{\partial t} = K_1 \frac{\partial i_1}{\partial x} \quad (9)$$

Where $\epsilon$ is porosity of electrode, i.e. volume fraction filled with acid, no unit $i_1$ is electric current density in the liquid phase of electrolyte, A/cm$^2$ $K_1$ is equivalent volume to charge constant, cm$^3$/As; defined as $$K_1^+ = \frac{1}{2F}\left(\frac{M_{PbSO4}}{\rho_{PbSO4}} - \frac{M_{PbO2}}{\rho_{PbO2}}\right) \text{ for the positive electrode and}$$

$$K_1^- = -\frac{1}{2F}\left(\frac{M_{PbSO4}}{\rho_{PbSO4}} - \frac{M_{Pb}}{\rho_{Pb}}\right) \text{ for the negative electrode;}$$

F is Faraday's constant

M is molecular weight of species, g/mol $\rho$ is density of species, g/cm$^3$

Calculate a new value for porosity by integration in time: $\epsilon_{t+\Delta t} = \epsilon_t + A_2 z_0 \Delta t$ where $\Delta t$ is the simulation time interval, $A_2$ is a double-diagonal matrix, and current density is a fixed parameter: $z_0 = i_{1,0}$.

Step 6: Solve Equation $$\epsilon \frac{\partial c}{\partial t} = \frac{\partial}{\partial x} D^{eff} \frac{\partial c}{\partial x} + (cK_1 + K_4)\frac{\partial i_1}{\partial x} \quad (10)$$

where $\epsilon$ is porosity of electrode, i.e. volume fraction filled with acid, no unit c is acid concentration, mol/cm$^3$ $D^{eff}$ is diffusion in porous media, $D^{eff} = D\epsilon^{\beta 5}$ D is diffusion constant of electrolyte, cm$^2$/s B5 is tortuosity exponent used for diffusion, no unit $$K_4 \frac{\partial i_1}{\partial x}$$

is volumetric production rate of ions, mol/cm$^3$s $K_4$ is equivalent molarity to charge constant, mol/As; defined as $K_4^+ = (2t_+^0 - 3)/2F$ for positive electrode and $K_4^- = -(2t_+^0 - 1)/2F$ for negative electrode $t_+^0$ is transference number, share of total current carried by H$^+$ ions, no unit.

Calculate a new value for acid concentration by integration in time: $c_{t+\Delta t} = c_t + [A_5(z_0)c_t + b(z_0)]\Delta t$ where $\Delta t$ is the simulation time interval, $A_5$ is a penta-diagonal matrix, $b(z_0)$ is a bilinear function, and porosity and current density are fixed parameters: $z_0 = [\epsilon_0, i_{1,0}]$.

Step 7: Solve Equation $$\frac{\partial \theta}{\partial t} = \alpha_{Ah} Q_{max}^{-1} \frac{\partial i_1}{\partial x} \quad (11)$$

where $\theta$ is state of charge, no unit $\alpha_{Ah}$ is charging efficiency, no unit $Q_{max}$ is theoretical capacity, C/cm$^3$ $i_1$ is electric current density in the liquid phase of electrolyte, A/cm$^2$.

Calculate a new value for state of charge by integration in time: $\theta_{t+\Delta t} = \theta_t + A_2 z_0 \Delta t$ where $\Delta t$ is the simulation time interval, $A_2$ is a double-diagonal matrix and current density is a fixed parameter: $z_0 = i_{1,0}$.

Replace $z_0$ with newly calculated values and return back to step 1.

The second method that is proposed here comprises calculating the current density as well as the solid and liquid potentials from an equation $$A_2 x_t = b(x_t, y_t) \quad (12)$$

while keeping porosity, acid concentration and state of charge as fixed parameters, and then calculating porosity, acid concentration and state of charge from iteration $$y_{t+1} = y_t + [A_S y_t - b(x_t, y_t)]\Delta t, \; y_t = y_0 \quad (13)$$

while keeping the current density as well as the solid and liquid potentials as fixed parameters. Here $x = [i_1, \Phi^S, \Phi^1]^T$ is a vector of current density, solid potential and liquid potential $y = [\epsilon, c, \theta]^T$ is a vector of porosity, acid concentration and state of charge $A_5$ is a penta-diagonal matrix $A_2$ is a double-diagonal matrix.

The second method would accommodate the utilization of feedback information in solving equation (12) so that the calculated current density comes to conform with the applied current, which in turn must be equal to the known current value.

The third method that is proposed here comprises solving the system (4) by iteration in time.

Figure 6:
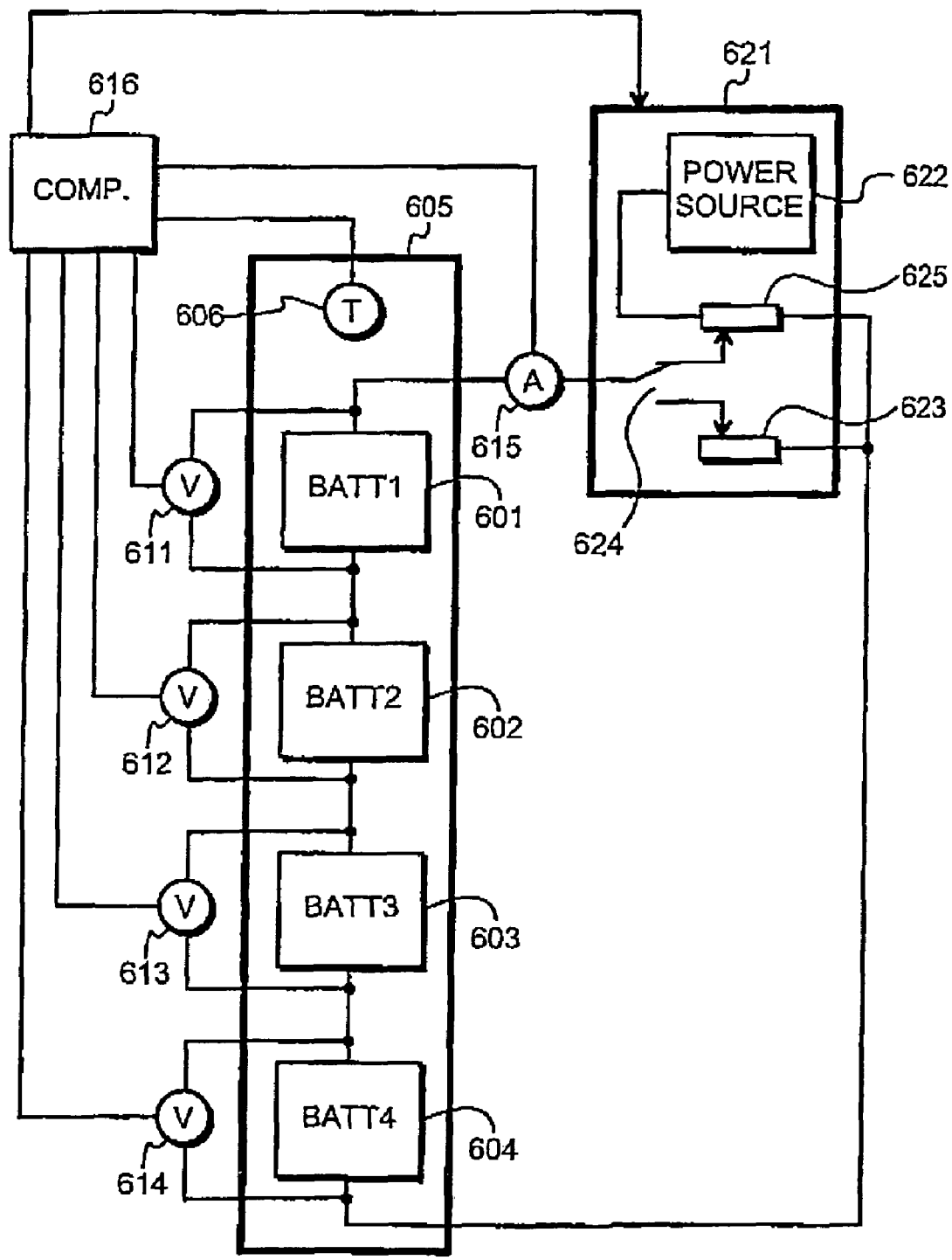

We will conclude by discussing certain features of an apparatus according to the invention. FIG. 6 illustrates an apparatus where an arrangement of back-up batteries consists of four VRLA batteries 601, 602, 603 and 604 coupled in series. The batteries are enclosed in a common container 605 that is thermally insulating at least to the extent that an internal temperature of the container measured at one point with a temperature sensor 606 can be reasonably well assumed to describe the external temperature of each battery for the purposes of taking into account the dependency of temperature of the electrochemical processes that take place inside each battery. The apparatus comprises voltage measuring means 611, 612, 613 and 614 that are coupled to measure the voltage over each individual battery respectively. Additionally the apparatus comprises electric current measuring means 615 coupled to measure the current that flows to or from the arrangement of serially coupled batteries. The outputs of the temperature sensor 606, the voltage measuring means 611, 612, 613 and 614 as well as the electric current measuring means 615 are coupled to measurement data inputs of a computer 616.

In order to facilitate controlled discharging and recharging of the batteries 611, 612, 613 and 614 there is a charge and discharge control entity 621 that comprises a power source 622, a load 623, a switch 624 and a charge regulator 625. The switch 624 is arranged to couple the arrangement of batteries 611, 612, 613 and 614 either to discharge through the load 623 or to receive recharging energy from the power source 622 through the charge regulator 625. The charge and discharge control entity 621 operates under the control of the computer 616. The arrangement shown in FIG. 6 relates most closely to an evaluation apparatus where the accuracy of the methods according to the invention can be verified. However, the same functional blocks also appear in a real-life battery back-up apparatus according to the invention. Those parts that relate to feeding electric power from a power source to a load during a normal situation where battery back-up is not instantly needed are not important to the invention and correspondingly not shown in FIG. 6.

The computer 616 is arranged to perform the mathematical methods and the related control algorithms that were discussed previously. In particular the computer 616 is adapted to command, as a response to fulfillment of the condition that triggers a transition to a model calibration state, the charge and discharge control entity 621 to implement a controlled discharging and recharging cycle. The computer 616 is also adapted to perform, during such a controlled discharging and recharging cycle, the necessary voltage, current and temperature measurements that are needed for model calibration. Additionally the computer 616 is adapted to perform, as a response to fulfillment of the condition that triggers a transition to a predictive calculation state, the calculations that implement a predictive calculation method according to the invention.

The invention does not limit the physical location of the components of the apparatus.

For example, the computer 616 can be a computer that is integrated to the other parts of an UPS apparatus, or the computer 616 can be located centrally at a control station that is remote from any actual UPS apparatus. The latter alternative naturally requires that suitable communication connections exist between each UPS apparatus concerned and the control station, so that the commands regarding transitions between states as well as the necessary measurement information can be transferred therebetween.

Various monitoring routines can be set up for systematic monitoring of the state and need of replacement of batteries in a multitude of battery back-up systems at different locations. If each system has a controlling computer of its own, these controlling computers are typically programmed to regularly perform model calibration and predictive calculation and only inform a centrally located control station if a predictive calculation shows that the predicted performance of a certain battery has fallen below a certain critical limit. If there is a single controlling computer, it typically performs a polling routine during which it contacts each monitored battery back-up system in turn, commands model calibration and performs predictive calculation.

The invention can also be applied as a part of the tests that are performed on newly manufactured batteries before delivery. The individual characteristics of even apparently identical batteries can vary, so the invention could help in ensuring uniform quality of delivered batteries.

The invention claimed is:

1. A method for simulating an operation of a rechargeable battery using a computing system comprising a processor and memory, the method comprising:
    calculating using said computer system, by using a surface overpotential value for the battery during discharging and recharging, a prediction value for a characteristic of the battery observable at a load upon detecting a condition indicating a transition from an idle state to a predictive calculation state, wherein the surface overpotential is determined as a function of a solid matrix potential, an electrolyte potential and a thermodynamic equilibrium potential;
    determining a difference between said prediction value and a known value and determining a correction factor, wherein the known value is based on a measured value and said correction factor is proportional to said difference; and
    adjusting the surface overpotential value using said correction factor and updating a simulation of the operation of the rechargeable battery using said computer system.

2. The method according to claim 1, wherein the calculating further comprises:
    calculating a first prediction value for a first characteristic of the rechargeable battery that is measurable outside the battery, calculating a second prediction value for a second characteristic of the rechargeable battery that is measurable outside the battery;
wherein said first prediction value is used for said determining; and
repeating said calculating the first prediction value and said calculating the second prediction value when said second prediction value meets a predetermined criterion.

3. The method according to claim 2, wherein the first prediction value is an electric current value, the second prediction value is a voltage value, and said predetermined criterion is a minimum voltage level.

4. The method according to claim 2, further comprising repeating the determining the difference and the adjusting the surface overpotential value until the difference is less than a predetermined limiting value, and only thereafter calculating the second prediction value for the second characteristic of the battery that is observable outside the battery.

5. The method according to claim 1, further comprising:
discharging and recharging the battery under controlled conditions,
measuring a voltage over the battery, a current through the battery and temperature of the battery during said discharging and recharging,
using the measured voltage, current, and temperature as references for determining initial values for parameters that describe the internal state of the battery;
and repeating said calculating a plurality of times in order to simulate the operation of the battery over a predetermined period of time.

6. An apparatus for simulating an operation of a rechargeable battery, comprising:
model calibration means for obtaining surface overpotential values for the battery during discharging and recharging, wherein the surface overpotential values are determined as a function of the following: solid matrix potential, an electrolyte potential and a thermodynamic equilibrium potential;
predictive calculation means for calculating, by using said obtained surface overpotential values, prediction values for characteristics of the battery that are observable at a load during a moment of initiating a back-up situation,
said model calibration means and said predictive calculation means being performed repetitively in order to simulate the operation of the battery over a predetermined period of time,
means for determining a difference between a calculated prediction value and a known value, wherein the known value is based on a measured value, and
means for adjusting said obtained surface overpotential values before calculating a further prediction value by an amount that is proportional to the difference and updating a simulation of the operation of the rechargeable battery.

7. The apparatus according to claim 6, further comprising:
means for calculating a first prediction value for a first current through the battery using a surface overpotential;
means for calculating a second prediction value for a voltage over the battery;
means for using said first prediction value for determining a difference between a calculated prediction value and a known value of a second current through the battery, and adjusting the surface overpotential before a further prediction value calculating step by an amount that is proportional to said difference; and
means for using said second prediction value as a criterion for determining whether the battery would be still capable of sustaining the supply of electric energy to the load at the moment of time represented by the present calculation.

8. The apparatus according to claim 7, wherein the computer is adapted to initiate a cycle of controllably discharging the battery through said load and recharging the battery from said power source, and to store said information received from said voltage measuring means, electric current measuring means and temperature measuring means during the cycle of controllably discharging and recharging, and to use the stored voltage, current and temperature information as references for determining initial values for parameters that describe surface overpotential values of the battery.

9. A method for simulating an operation of a rechargeable battery using a computing system comprising a processor and memory, the method comprising:
Calculating using said computer system, by using a surface overpotential values for the battery during discharging and recharging, at least one prediction value for a characteristic of the battery that is observable at a load during a moment of initiating a back-up situation, wherein the surface overpotential value is determined as a function of a solid matrix potential, an electrolyte potential and a thermodynamic equilibrium potential;
repeating said calculating a plurality of times in order to simulate the operation of the battery over a predetermined period of time;
detecting a difference between said at least one calculated prediction value and a known value of a corresponding characteristic in a corresponding situation, wherein the known value is based on a measured value;
comparing the detected difference to a threshold value; and
adjusting the surface overpotential value by an amount that is proportional to said detected difference and using the adjusted surface overpotential value to simulate the operation of the rechargeable battery when the detected difference exceeds the threshold value using said computer system.

10. A method for simulating an operation of a rechargeable battery using a computing system comprising a processor and memory, the method comprising:
calculating using said computer system, by using at least one overpotential parameter of the battery during discharging and recharging, a time-independent prediction of battery current that is observable at a load during a moment of simulating a backup situation, wherein the overpotential parameter is determined as a function of a solid matrix potential, an electrolyte potential and a thermodynamic equilibrium potential;
simulating the operation of the battery by repeating said calculating over a predetermined period of time;
determining a difference between said time-independent prediction of current value and a known current value, wherein the known current value is based on a measured value; and
adjusting said at least one overpotential parameter by an amount that is proportional to said difference and updating a simulation of the operation of the rechargeable battery using said computer system.

11. The method according to claim 10, further comprising repeating said determining and adjusting until the determined difference is less than a predetermined limiting value.

12. An apparatus for simulating an operation of a rechargeable battery, comprising:
at least one rechargeable battery;
at least one voltage measuring subsystem coupled to said at least one rechargeable battery;

at least one electric current measuring subsystem coupled to said at least one rechargeable battery;

at least one temperature measuring subsystem for measuring a temperature of said at least one rechargeable battery;

a charge and discharge control subsystem; and a computer that is coupled to receive information from said voltage measuring subsystem, electric current measuring subsystem and temperature measuring subsystem, and coupled to control said charge and discharge control subsystem, wherein said computer is adapted to perform a method comprising:

obtaining surface overpotential values for the battery during discharging and recharging, wherein the surface overpotential values are determined as a function solid matrix potential, an electrolyte potential and a thermodynamic equilibrium potential;

calculating, by using said obtained surface overpotential values, prediction values for characteristics of the rechargeable battery that are observable at a load during a moment of initiating a back-up situation, repeating said obtaining and calculating to simulate the operation of the battery over a predetermined period of time, determining a difference between a calculated prediction value and a known value, wherein the known value is based on a measured value, and adjusting an obtained surface overpotential value before calculating a further prediction value by an amount that is proportional to said difference and updating a simulation of the operation of the rechargeable battery.

13. A computer-readable storage medium comprising computer-executable instructions for simulating an operation of a rechargeable battery, the computer readable storage medium comprising instructions for:

instructions for calculating, by using a surface potential value for the battery during discharging and recharging, a prediction value for a characteristic of the battery observable at a load upon detecting a condition indicating a transition from an idle state to a predictive calculation state, wherein the surface overpotential value is determined as a function of a solid matrix potential, an electrolyte potential and a thermodynamic equilibrium potential;

instructions for determining a difference between said prediction value and a known value and determining a correction factor, wherein the known value is based on a measured value and said correction factor is proportional to said difference; and instructions for adjusting the surface overpotential value using said correction factor and updating a simulation of the operation of the rechargeable battery.

14. A computer-readable storage medium comprising computer-executable instructions for simulating an operation of a rechargeable battery, the computer readable storage medium comprising instructions for:

instructions for calculating, by using a surface overpotential values for the battery during discharging and recharging, at least one prediction value for a characteristic of the battery that is observable at a load during a moment of initiating a back-up situation, wherein the surface overpotential value is determined as a function of a solid matrix potential, an electrolyte potential and a thermodynamic equilibrium potential;

instructions for repeating said calculating a plurality of times in order to simulate the operation of the battery over a predetermined period of time;

instructions for detecting a difference between said at least one calculated prediction value and a known value of a corresponding characteristic in a corresponding situation, wherein the known value is based on a measured value;

instructions for comparing the detected difference to a threshold value; and instructions for adjusting the surface overpotential value by an amount that is proportional to said detected difference and using the adjusted surface overpotential value to simulate the operation of the rechargeable battery when the detected difference exceeds the threshold value.

15. A computer-readable storage medium comprising computer-executable instructions for simulating an operation of a rechargeable battery, the computer readable storage medium comprising instructions for:

instructions for calculating, by using at least one overpotential parameter of the battery during discharging and recharging, a time-independent prediction of battery current value that is observable at a load during a moment of simulating a backup situation, wherein the at least one overpotential parameter is determined as a function of a solid matrix potential, an electrolyte potential and a thermodynamic equilibrium potential;

instructions for simulating the operation of the battery by repeating said calculating over a predetermined period of time;

instructions for determining a difference between said time-independent prediction of current value and a known current value, wherein the known current value is based on a measured current value; and instructions for adjusting said at least one overpotential parameter by an amount that is proportional to said difference and updating a simulation of the operation of the rechargeable battery.

* * * * *